US010281085B1

United States Patent
Shen

(10) Patent No.: US 10,281,085 B1
(45) Date of Patent: May 7, 2019

(54) HEAD-MOUNTED WIRELESS PHOTOGRAPHIC APPARATUS

(71) Applicant: FASPRO SYSTEMS CO., LTD., Taipei (TW)

(72) Inventor: Echin Shen, Taipei (TW)

(73) Assignee: FASPRO SYSTEMS CO., LTD., Taipei (TW)

(*) Notice: Subject to any disclaimer, the term of this patent is extended or adjusted under 35 U.S.C. 154(b) by 0 days.

(21) Appl. No.: 15/941,445

(22) Filed: Mar. 30, 2018

(51) Int. Cl.
| G09B 5/02 | (2006.01) |
| F16M 13/04 | (2006.01) |
| G03B 17/02 | (2006.01) |
| G03B 17/04 | (2006.01) |
| G03B 17/56 | (2006.01) |
| G03B 19/12 | (2006.01) |

(52) U.S. Cl.
CPC ........... *F16M 13/04* (2013.01); *G03B 17/561* (2013.01); *G09B 5/02* (2013.01); *G03B 17/02* (2013.01); *G03B 17/04* (2013.01); *G03B 17/56* (2013.01); *G03B 19/12* (2013.01); *G03B 2215/0507* (2013.01)

(58) Field of Classification Search
CPC .................................................... G03B 17/56
USPC ........... 396/424; 381/74, 374, 379; 600/249, 600/301, 595
See application file for complete search history.

(56) References Cited

U.S. PATENT DOCUMENTS

| 5,457,751 | A | * | 10/1995 | Such | H04M 1/05 348/115 |
| 6,421,031 | B1 | * | 7/2002 | Ronzani | G02B 27/017 345/8 |
| 6,560,029 | B1 | * | 5/2003 | Dobbie | G02B 23/125 2/6.1 |
| 7,219,370 | B1 | * | 5/2007 | Teetzel | A42B 3/04 2/422 |
| 9,360,682 | B1 | * | 6/2016 | Edwards | G02C 11/10 |
| RE46,463 | E | * | 7/2017 | Fienbloom | F21L 14/00 |
| 9,837,043 | B1 | * | 12/2017 | Patel | G09G 5/006 |
| 9,989,998 | B1 | * | 6/2018 | Yee | G06F 1/163 |

(Continued)

OTHER PUBLICATIONS

Surgical Video System, Swis Surgical, https://swissurgicalvideo.com/product-line/video-system, 2016, pp. 31.*

*Primary Examiner* — Clayton E. LaBalle
*Assistant Examiner* — Kevin C Butler
(74) *Attorney, Agent, or Firm* — Lynette Wylie; Apex Juris, pllc.

(57) ABSTRACT

A head-mounted wireless photographic apparatus has a first module, a second module movably connected to the first module, and a camera pivotally connected to the second module. The first module has two occipital abutting portions deposited on an end of the first module at a spaced interval. The second module has two forehead abutting portions deposited on an end of the second module at a spaced interval and being opposite to the two occipital abutting portions of the first module. A distance between the first module and the second module can be adjusted according to a user's head size to enable the two occipital abutting portions to abut against the back of the user's head and the two forehead abutting portions to abut against the forehead of the user. Then, the head-mounted wireless photographic apparatus can be mounted on the user's head firmly.

21 Claims, 8 Drawing Sheets

(56) References Cited

U.S. PATENT DOCUMENTS

| | | | |
|---|---|---|---|
| 10,045,449 B1* | 8/2018 | Yee | H05K 5/0217 |
| 2004/0097839 A1* | 5/2004 | Epley | A61B 5/0484 |
| | | | 600/595 |
| 2007/0161875 A1* | 7/2007 | Epley | A61B 5/0484 |
| | | | 600/301 |
| 2008/0170838 A1* | 7/2008 | Teetzel | A42B 3/042 |
| | | | 386/358 |
| 2008/0239707 A1* | 10/2008 | Feinbloom | F21L 14/00 |
| | | | 362/105 |
| 2008/0253695 A1* | 10/2008 | Sano | A61B 5/16 |
| | | | 382/305 |
| 2009/0216070 A1* | 8/2009 | Hunt | H04N 5/775 |
| | | | 600/27 |
| 2011/0105851 A1* | 5/2011 | Horvath | A61B 50/26 |
| | | | 600/249 |
| 2012/0188345 A1* | 7/2012 | Salow | H04N 21/2743 |
| | | | 348/143 |
| 2013/0089214 A1* | 4/2013 | Tricoukes | G06F 1/163 |
| | | | 381/74 |
| 2013/0222235 A1* | 8/2013 | Abdollahi | G02B 27/0172 |
| | | | 345/156 |
| 2013/0308099 A1* | 11/2013 | Stack | A61B 3/113 |
| | | | 351/209 |
| 2013/0321775 A1* | 12/2013 | Richter | A61B 3/032 |
| | | | 351/221 |
| 2014/0085190 A1* | 3/2014 | Erinjippurath | G06F 3/012 |
| | | | 345/156 |
| 2014/0184775 A1* | 7/2014 | Drake | A61B 3/14 |
| | | | 348/78 |
| 2015/0002374 A1* | 1/2015 | Erinjippurath | G02B 27/0172 |
| | | | 345/8 |
| 2015/0157255 A1* | 6/2015 | Nduka | A61B 5/165 |
| | | | 600/301 |
| 2015/0338723 A1* | 11/2015 | Duncan | H04N 5/2252 |
| | | | 348/373 |
| 2016/0225192 A1* | 8/2016 | Jones | G06F 3/012 |
| 2016/0324580 A1* | 11/2016 | Esterberg | A61B 34/10 |
| 2016/0363772 A1* | 12/2016 | Miller | F16M 13/00 |
| 2017/0188993 A1* | 7/2017 | Hamilton | A61B 8/4218 |
| 2018/0103928 A1* | 4/2018 | Costa | A61B 8/0808 |

\* cited by examiner

HEAD-MOUNTED WIRELESS PHOTOGRAPHIC APPARATUS

BACKGROUND OF THE INVENTION

1. Field of the Invention

The present invention relates to a head-mounted wireless photographic apparatus, and more particularly to a head-mounted wireless photographic apparatus that may adjust a length of the head-mounted wireless photographic apparatus and may abut against a user's head firmly.

2. Description of Related Art

Generally, in order to provide medical teaching, live broadcast for observation, and as a proof of future medical disputes, a camera is installed on a conventional surgical lighting to record the surgical procedure. However, in use, the conventional surgical lighting has a problem that it is difficult to maintain a good shooting quality because of a distance between a surgical site and the conventional surgical lighting. In view of the above, there is a conventional glasses-type photographic apparatus in which a camera is deposited on a lens structure of the conventional glasses-type photographic apparatus, and is worn by a surgeon. In this way, the camera is parallel to the surgeon's eye so that better quality images can be recorded. However, in use, the conventional glasses-type photographic apparatus may easily slide off the bridge of a nose of the surgeon, and this not only makes it difficult for the camera to keep focusing on the surgical site, but also the surgeon must frequently adjust the position of the conventional glasses-type photographic apparatus during the operation.

Additionally, there is a conventional belt-type photographing apparatus in which a camera is deposited on a band to allow a doctor to wear the conventional belt-type photographing apparatus on the doctor's head by the band. However, the degree of tightness of the band cannot be adjusted and it is difficult to apply to skulls of different users. For example, for a doctor with a larger head, the band is too tight, and this may make the doctor feel uncomfortable during the operation because the head is oppressed by the band. Furthermore, for a doctor with a smaller head, the band is too loose and may slip easily during the operation, and this makes it difficult for the camera to keep focusing on the surgical site.

In addition, whether it be the conventional glasses-type photographic apparatus or the belt-type photographing apparatus, the camera is connected to a power cord and a transmission wire, and the power cord and the transmission wire are securely deposited on the lens structure or the band, and the doctors may be easily affected by the messy cord and wire during the surgery.

The head-mounted wireless photographic apparatus in accordance with the present invention mitigates or obviates the aforementioned problems.

SUMMARY OF THE INVENTION

The main objective of the present invention is to provide a head-mounted wireless photographic apparatus that may adjust a length of the head-mounted wireless photographic apparatus and may abut against a user's head firmly.

The head-mounted wireless photographic apparatus in accordance with the present invention has a first module, a second module movably connected to the first module, and a camera pivotally connected to the second module. The first module has two occipital abutting portions deposited on an end of the first module at a spaced interval. The second module has two forehead abutting portions deposited on an end of the second module at a spaced interval and being opposite to the two occipital abutting portions of the first module. A distance between the first module and the second module can be adjusted according to a user's head size to enable the two occipital abutting portions to abut against the back of the user's head and the two forehead abutting portions to abut against the forehead of the user. Then, the head-mounted wireless photographic apparatus can be mounted on the user's head firmly to overcome the problems of slippage and difficulty in focus of the conventional glasses-type photographic apparatus and the conventional belt-type photographing apparatus.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a first embodiment of a head-mounted wireless photographic apparatus in accordance with the present invention has a first module 10, a second module 20, and a camera 30.

Figure 1:
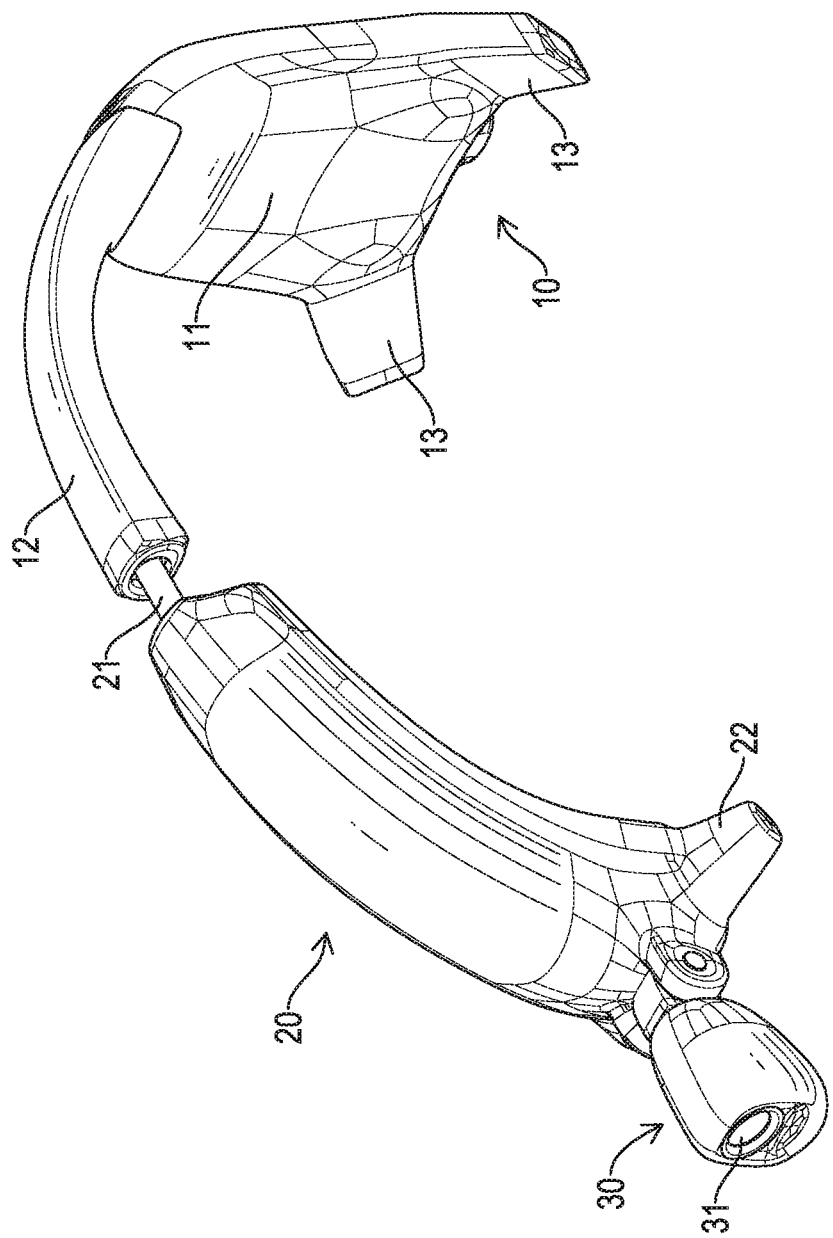
FIG. 1 is a perspective view of a first embodiment of a head-mounted wireless photographic apparatus in accordance with the present invention.
Figure 2:
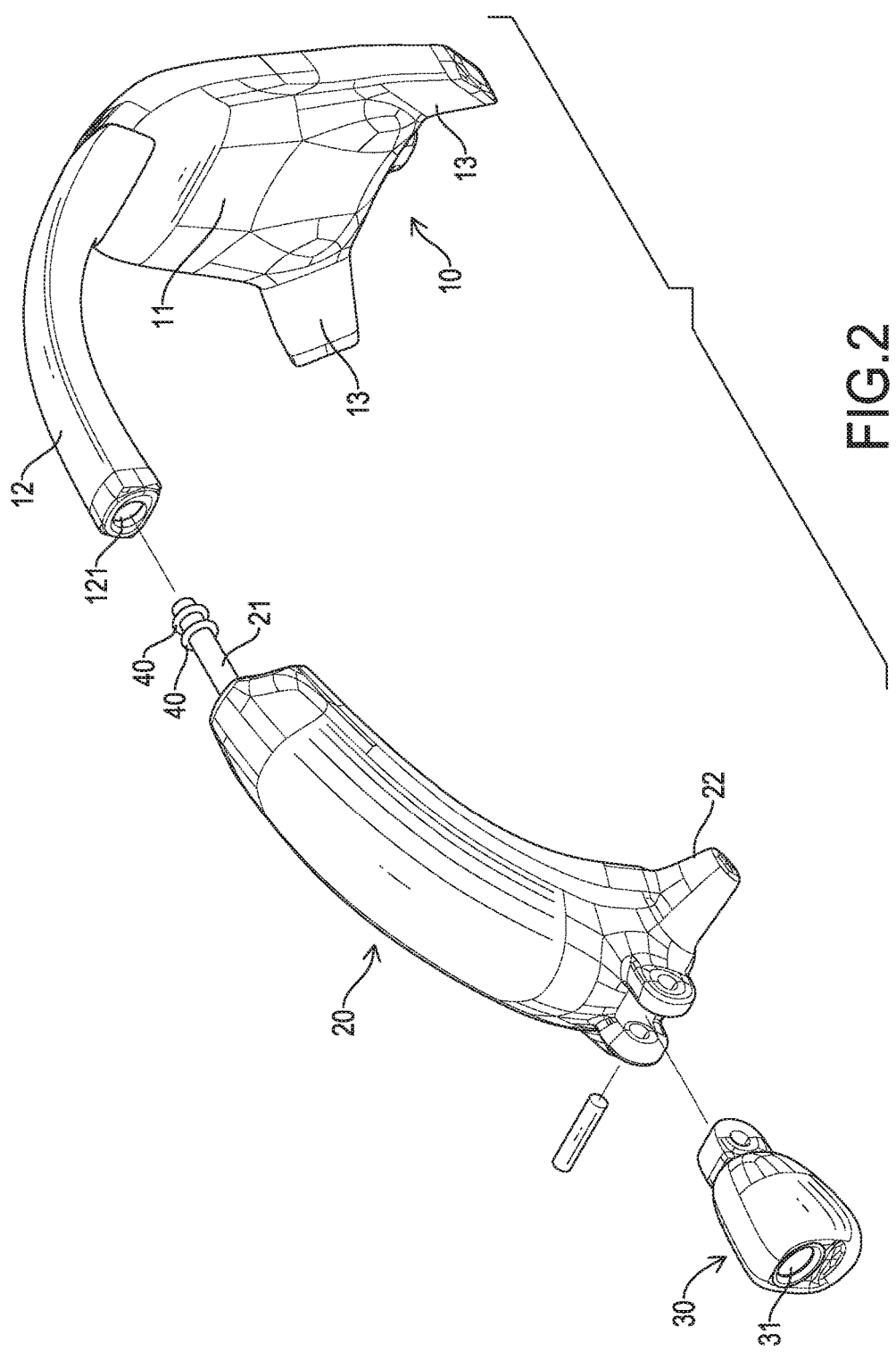
FIG. 2 is an exploded perspective view of the head-mounted wireless photographic apparatus in FIG. 1.
Figure 3:
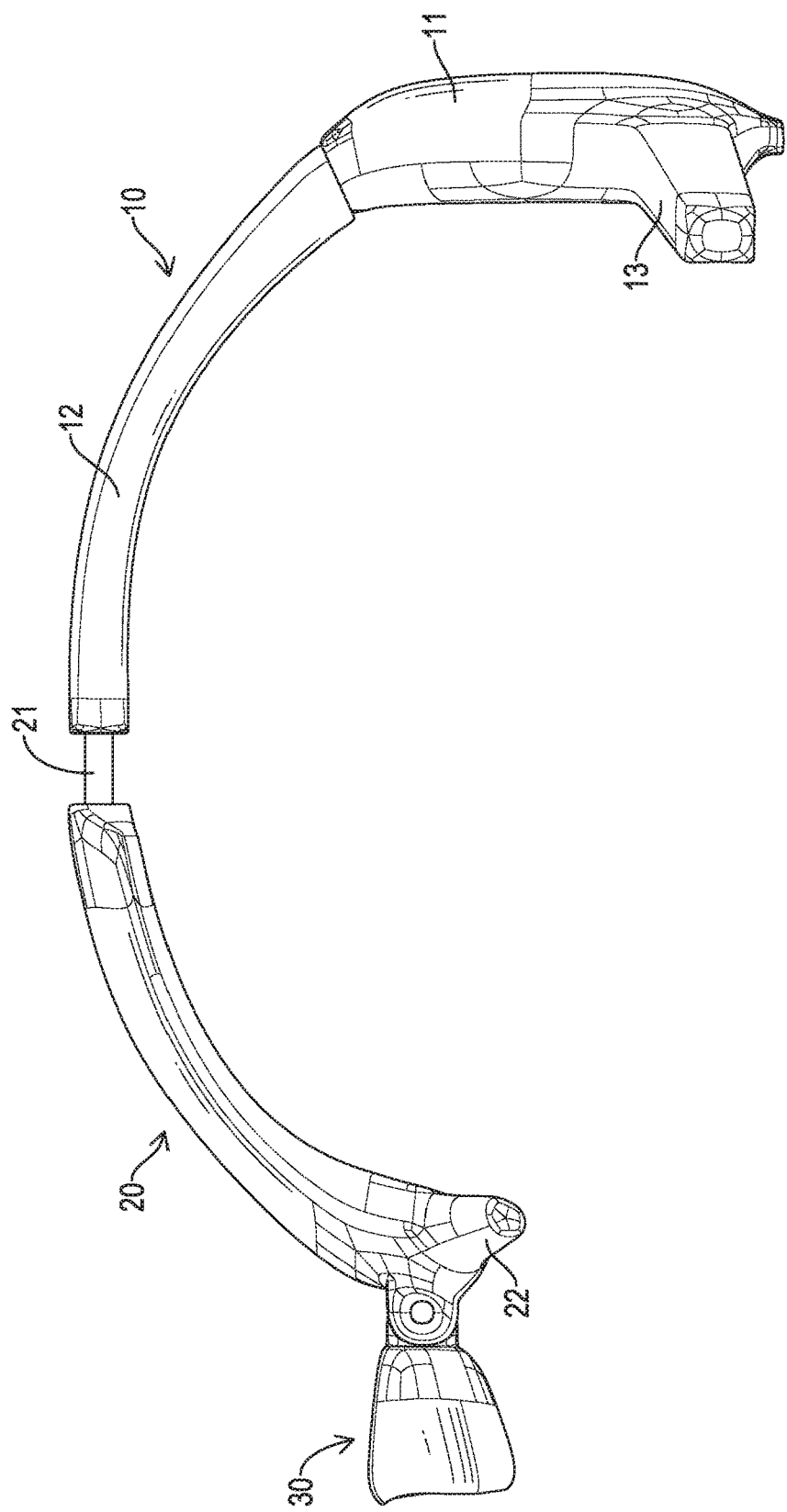
FIG. 3 is a side perspective view of the head-mounted wireless photographic apparatus in FIG. 1.
Figure 4:
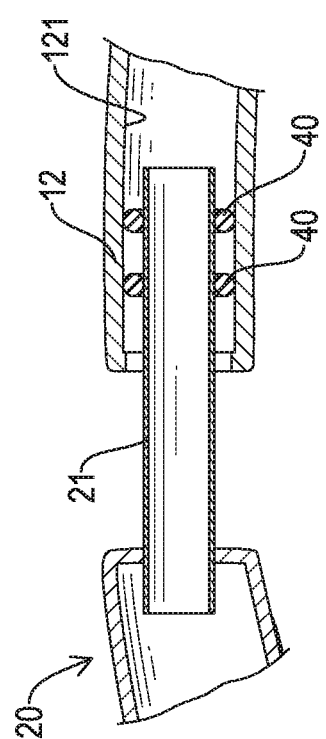
FIG. 4 is an enlarged cross sectional side view of the head-mounted wireless photographic apparatus in FIG. 1.

The first module 10 has a body 11, a tubular portion 12, and two occipital abutting portions 13. The body 11 has a chamber formed in the body 11 and has a top side, a middle, and a bottom side. The tubular portion 12 is curvedly formed on and protrudes upwardly and forwardly from the top side of the body 11 at the middle of the body 11, and has an interior, a free end, an inner sidewall 121, and an opening. The interior is formed in the tubular portion 12 and communicates with the chamber of the body 11. The free end of the tubular portion 12 is opposite to the top side of the body 11. With further reference to FIG. 4, the inner sidewall 121 is formed in the tubular portion 12 around the interior of the tubular portion 12. The opening is formed in the free end of the tubular portion 12 and communicates with the interior of the tubular portion 12. The two occipital abutting portions 13 are formed on and protrude outwardly from the bottom side of the body 11 at a spaced interval, and curvedly extend along a direction same as that of the tubular portion 12.

The second module 20 is movably connected to the first module 10, is hollow to communicate with the tubular portion 12 of the first module 10, and has a rear end, a front end, an inserting pipe 21 and two forehead abutting portions 22. The inserting pipe 21 is deposited on the rear end of the second module 20, communicates with the interior of the tubular portion 12, and has an inserting end and two tightening elements 40. The inserting end of the inserting pipe 21 is opposite to the front end of the second module 20, and is movably inserted into the interior of the tubular portion 12 via the opening of the tubular portion 12. The two tightening elements 40 are deposited on the inserting pipe 21 at a spaced interval adjacent to the inserting end of the inserting pipe 21, and each one of the two tightening elements 40 has an outer diameter corresponding to an inner diameter of the interior of the tubular portion 12.

Then, when the inserting pipe 21 is connected to the tubular portion 12, the two tightening elements 40 abut against the inner sidewall 121 of the tubular portion 12 to hold the second module 20 with the first module 10. This means, the friction forces between the two tightening elements 40 and the inner sidewall 121 of the tubular portion 12 may provide a tightening effect between the tubular portion 12 and the inserting pipe 21. Consequently, an inserting length of the inserting pipe 21 relative to the tubular portion 12 can be adjusted by resisting the friction forces between the two tightening elements 40 and the inner sidewall 121 of the tubular portion 12, and this may change a distance between the second module 20 and the first module 10. The two forehead abutting portions 22 are deposited on the front end of the second module 20 at a spaced interval and are opposite to the inserting pipe 21.

The camera 30 is connected to the second module 20, is pivotally connected to the front end of the second module 20 between the two forehead abutting portions 22 to enable the camera 30 to swing up and down relative to the second module 20, and has a pivot end, a free end, and a lens unit 31. The pivot end of the camera 30 is pivotally connected to the front end of the second module 20. The free end of the camera 30 is opposite to the pivot end of the camera 30 and extends forwardly from the front end of the second module 20. The lens unit 31 is deposited in the free end of the camera 30.

Figure 5:
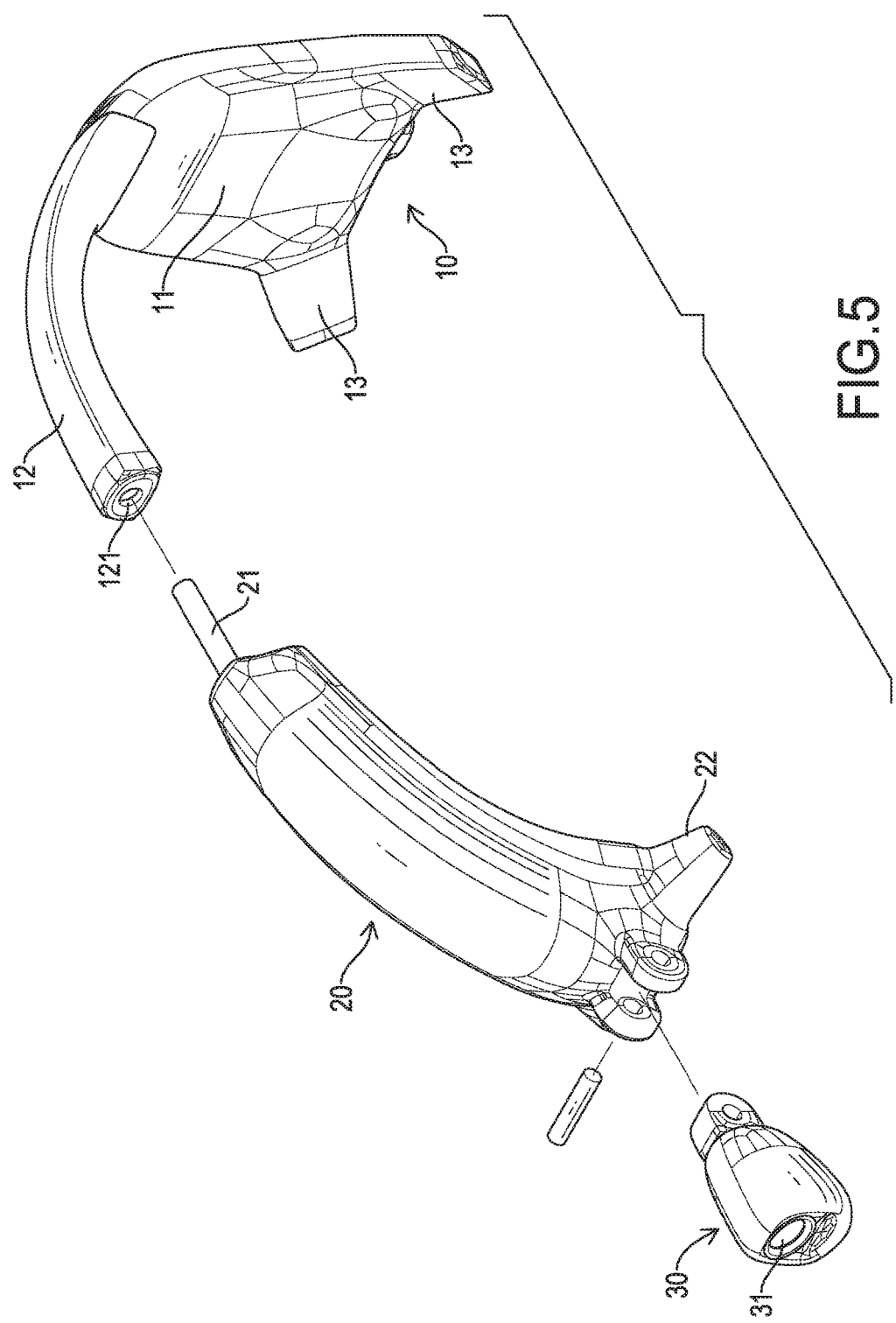
FIG. 5 is an exploded perspective view of a second embodiment of a head-mounted wireless photographic apparatus in accordance with the present invention.
Figure 6:
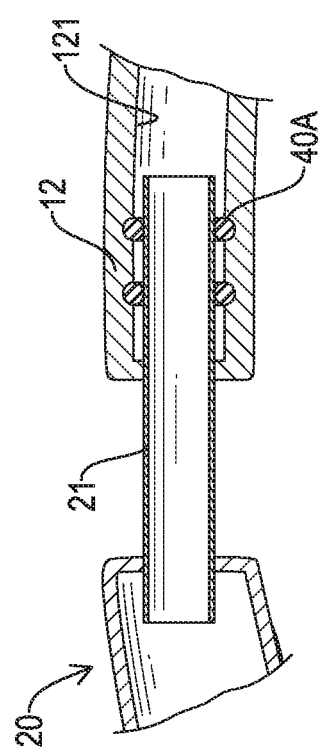
FIG. 6 is an enlarged cross sectional side view of the head-mounted wireless photographic apparatus in FIG. 5.

With reference to FIGS. 5 and 6, a second embodiment of a head-mounted wireless photographic apparatus in accordance with the present invention is substantially the same as the first embodiment except for the following features. The two tightening elements 40A are engaged on the inner sidewall 121 of the tubular portion 12 at a spaced interval adjacent the free end of the tubular portion 12. Furthermore, each one of the two tightening elements 40A has an inner diameter corresponding to an outer diameter of the inserting pipe 21. When the inserting pipe 21 is inserted into the tubular portion 12, the inserting end of the inserting pipe 21 extends through the two tightening elements 40A to enable the inserting pipe 21 to abut against the two tightening elements 40A, and this also can provide a tightening effect between the tubular portion 12 and the inserting pipe 21 by the friction forces between the two tightening elements 40A and the inserting pipe 21. Then, the distance between the second module 20 and the first module 10 can be changed by adjusting the inserting length of the inserting pipe 21 relative to the tubular portion 12.

Figure 7:
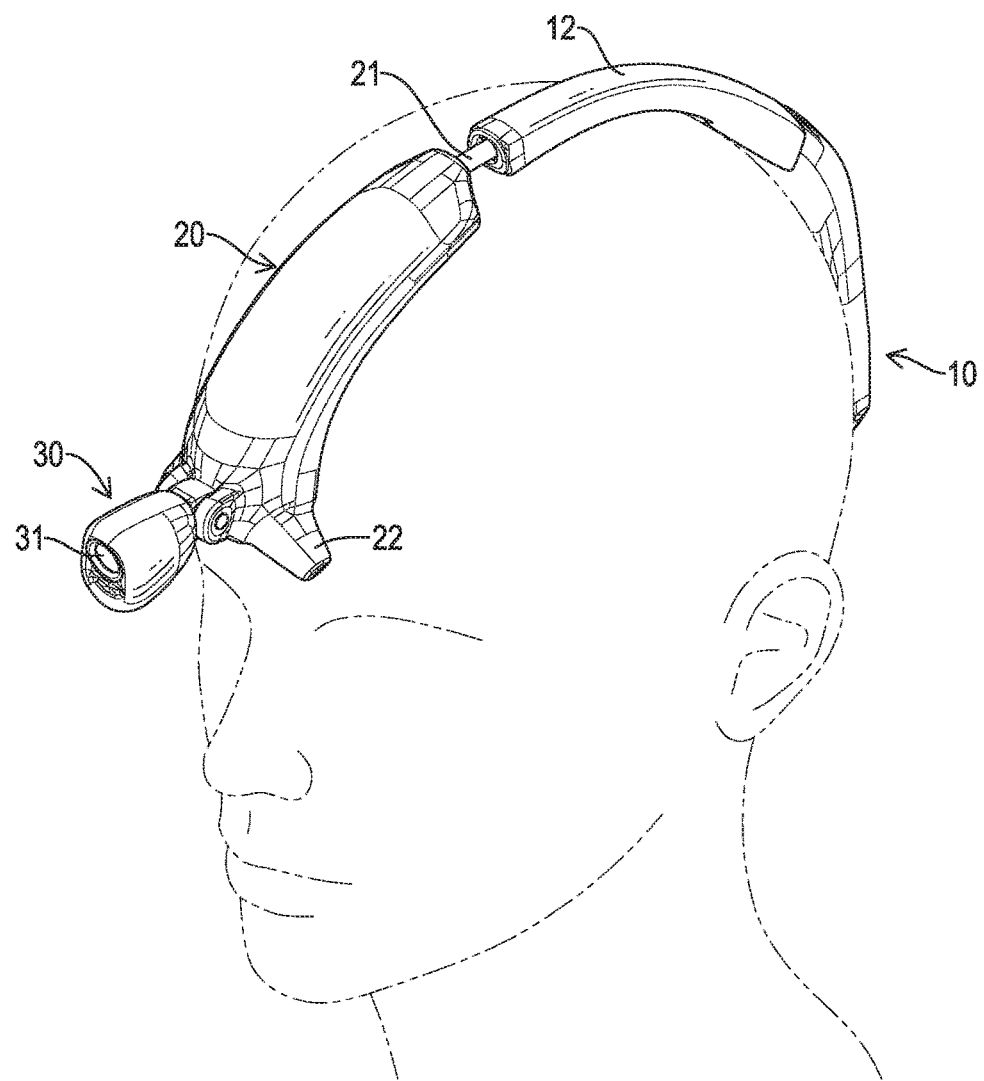
FIG. 7 is an operational perspective view of the head-mounted wireless photographic apparatus in FIG. 1, mounted on a user's head.
Figure 8:
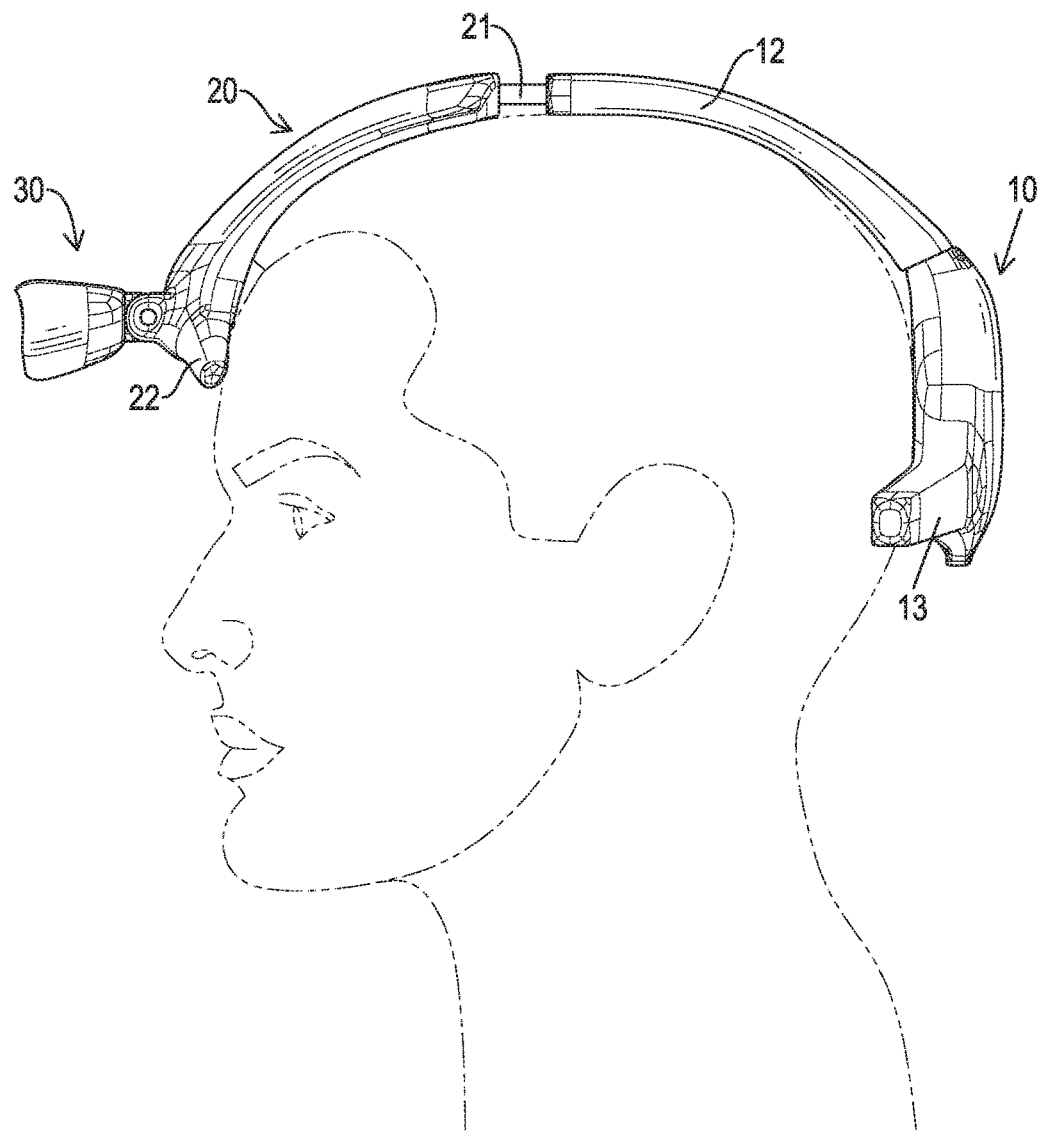
FIG. 8 is an operational side view of the head-mounted wireless photographic apparatus in FIG. 7.

According to the above-mentioned features and structural relationships of the head-mounted wireless photographic apparatus in accordance with the present invention, with reference to FIGS. 7 and 8, the inserting pipe 21 is movably connected to the tubular portion 12, and the distance between the second module 20 and the first module 10 can be changed and adjusted according to the head size of a user by moving the inserting pipe 21 relative to the tubular portion 12. Furthermore, the two occipital abutting portions 13 abut against the back of the user's head, the two forehead abutting portions 22 abut against the forehead of the user, and then the head-mounted wireless photographic apparatus can be deposited on the user's head firmly to overcome the problems of slippage and difficulty in focus of the conventional glasses-type photographic apparatus and the conventional belt-type photographing apparatus.

Preferably, wires such as power cords and transmission wires that are needed by the camera 30 can be deposited in the first module 10 and the second module 20 via the inserting pipe 21, the tubular portion 12 and the body 11 that communicate with each other. Therefore, the vision of the user may not be affected or blocked by the wires when using the head-mounted wireless photographic apparatus during the operation.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A head-mounted wireless photographic apparatus having:
    a first module having two occipital abutting portions deposited on an end of the first module at a spaced interval;
    a second module movably connected to the first module to change a distance between the second module and the first module and having two forehead abutting portions deposited on an end of the second module at a spaced interval and being opposite to a connection position between the first module and the second module; and
    a camera deposited on the second module between the two forehead abutting portions of the second module.

2. The head-mounted wireless photographic apparatus as claimed in claim 1, wherein the first module has a tubular portion deposited on the first module and being opposite to the two occipital abutting portions.

3. The head-mounted wireless photographic apparatus as claimed in claim 2, wherein the second module has an inserting pipe deposited on the second module adjacent to the connection position between the first module and the second module, and movably inserted in and connected to the tubular portion of the first module.

4. The head-mounted wireless photographic apparatus as claimed in claim 2, wherein the first module is hollow, the second module is hollow, and the first module communicates with the second module.

5. The head-mounted wireless photographic apparatus as claimed in claim 2, wherein the camera is pivotally connected to the second module.

6. The head-mounted wireless photographic apparatus as claimed in claim 3, wherein the inserting pipe has two tightening elements deposited on the inserting pipe at a spaced interval, and each one of the two tightening elements has an outer diameter corresponding to an inner diameter of the tubular portion.

7. The head-mounted wireless photographic apparatus as claimed in claim 6, wherein the first module is hollow, the second module is hollow, and the first module communicates with the second module via the tubular portion and the inserting pipe.

8. The head-mounted wireless photographic apparatus as claimed in claim 6, wherein the first module is hollow, the second module is hollow, and the first module communicates with the second module.

9. The head-mounted wireless photographic apparatus as claimed in claim 6, wherein the camera is pivotally connected to the second module.

10. The head-mounted wireless photographic apparatus as claimed in claim 7, wherein the camera is pivotally connected to the second module.

11. The head-mounted wireless photographic apparatus as claimed in claim 3, wherein the tubular portion has two tightening elements engaged in an inner sidewall of the tubular portion at a spaced interval, and each one of the two tightening elements has an inner diameter corresponding to an outer diameter of the inserting pipe.

12. The head-mounted wireless photographic apparatus as claimed in claim 11, wherein the first module is hollow, the second module is hollow, and the first module communicates with the second module via the tubular portion and the inserting pipe.

13. The head-mounted wireless photographic apparatus as claimed in claim 11, wherein the first module is hollow, the second module is hollow, and the first module communicates with the second module.

14. The head-mounted wireless photographic apparatus as claimed in claim 11, wherein the camera is pivotally connected to the second module.

15. The head-mounted wireless photographic apparatus as claimed in claim 12, wherein the camera is pivotally connected to the second module.

16. The head-mounted wireless photographic apparatus as claimed in claim 3, wherein the first module is hollow, the second module is hollow, and the first module communicates with the second module via the tubular portion and the inserting pipe.

17. The head-mounted wireless photographic apparatus as claimed in claim 16, wherein the camera is pivotally connected to the second module.

18. The head-mounted wireless photographic apparatus as claimed in claim 3, wherein the first module is hollow, the second module is hollow, and the first module communicates with the second module.

19. The head-mounted wireless photographic apparatus as claimed in claim 3, wherein the camera is pivotally connected to the second module.

20. The head-mounted wireless photographic apparatus as claimed in claim 1, wherein the first module is hollow, the second module is hollow, and the first module communicates with the second module.

21. The head-mounted wireless photographic apparatus as claimed in claim 1, wherein the camera is pivotally connected to the second module.

* * * * *